Nov. 7, 1944.  M. S. BAKER  2,362,341
SEAL
Filed May 28, 1943
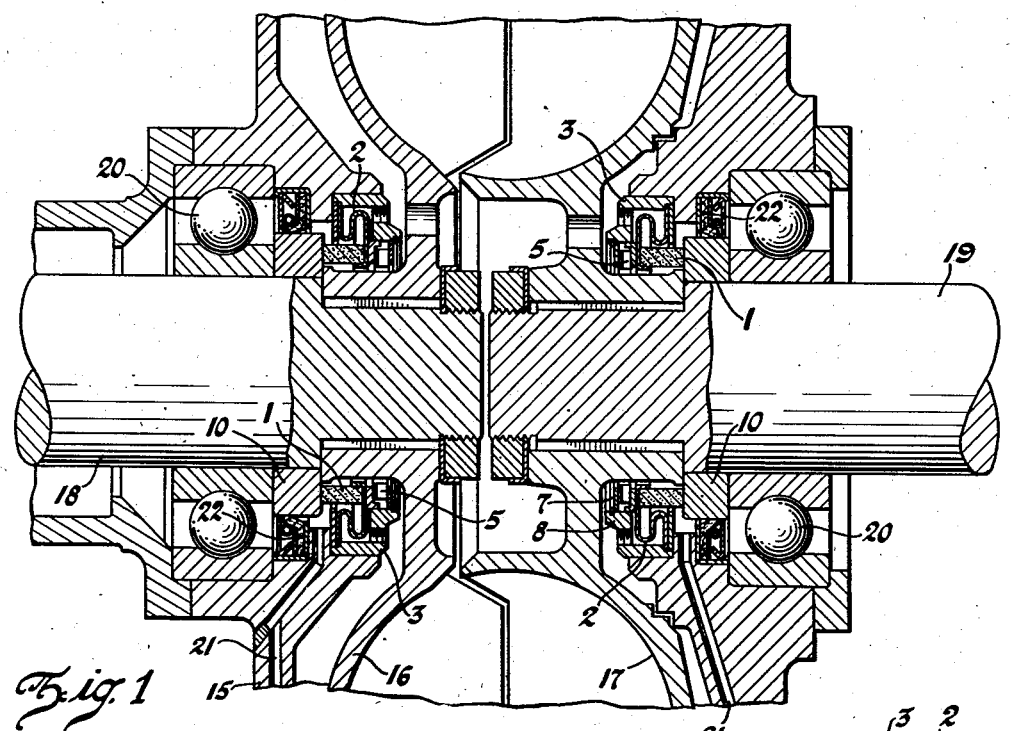
Fig. 1
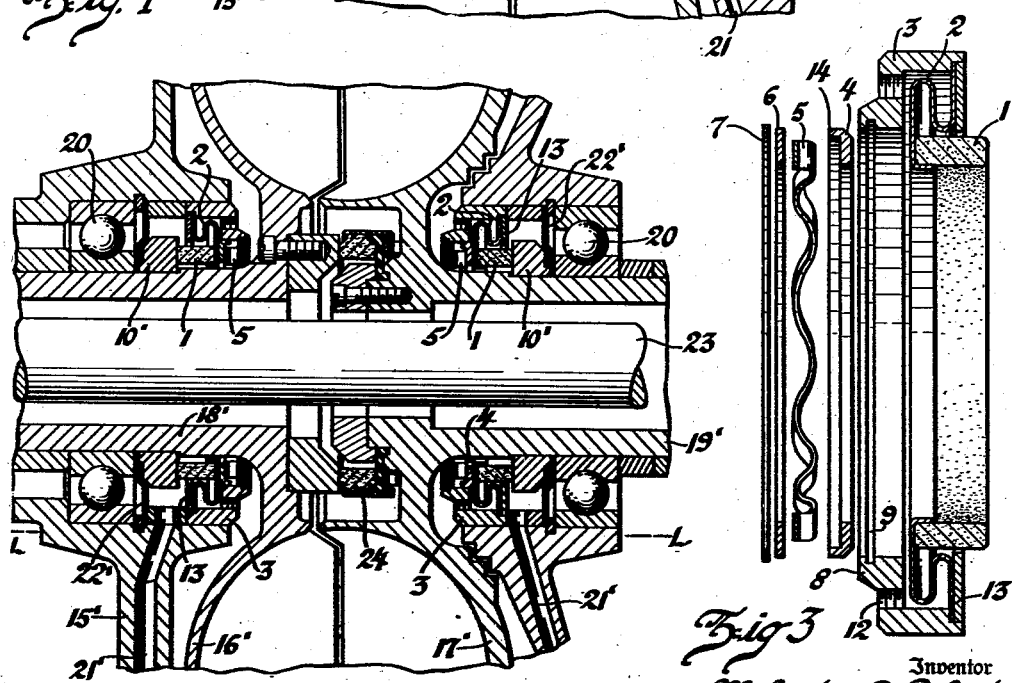
Fig. 2
Fig. 3
Inventor
Malvern S. Baker
By Blackmore, Spencer Hunt
Attorneys Patented Nov. 7, 1944

2,362,341

UNITED STATES PATENT OFFICE 2,362,341

SEAL

Malvern S. Baker, Pontiac, Mich., assignor, by mesne assignments, to General Motors Corporation, Detroit, Mich., a corporation of Delaware Application May 28, 1943, Serial No. 488,839

4 Claims. (Cl. 286—11)

This invention relates to an improved arrangement of structural elements for meeting vexatious problems of liquid leakage between relatively rotating parts. Various types of running fit seals have been devised, including the kind in which a sealing ring is carried on the free end of a flexible bellows and is biased toward tight slip fit engagement with a cooperating relatively rotatable ring. Such seals are effective in uses for which they are designed, except that each different set of operating conditions, such as relative rotational speeds, variable pressures and temperatures as well as space and installation restrictions, present peculiar problems which need to be dealt with individually.

In a torque converter drive transmission for vehicles where savings in space and weight are premiums it is highly desirable to have a compact design and it is one of the objects of the present invention to provide a seal of condensed overall size having a few small parts closely grouped and so joined together as to require a minimum of space. While the parts are small they are designed for sturdiness and are arranged for mutual protective cooperation with respect both to normal operation and their handling as units in manufacture, shipment and storage.

Another object of the invention is to provide concentrically related sealing ring, mounting holder and bellows, the latter having its anchored end and its free end fixed, respectively, to the holder and to the sealing ring and all compactly nested one inside the other protectively; the other parts required to furnish a spring force being added detachably to the main assembly at the time of installation. Heretofore the spring biasing means was a permanent part of the assembly or replacement service part which tended to cause a permanent set or bad distortion of the more delicate bellows during the storage period.

A further object of the invention is to fasten the anchored end flange of the bellows to a stiff backing plate which also is secured to the mounting holder and completes the incasement of the flexible bellows. The backing plate furthermore reduces unbalance of pressures on the expanse of exposed bellows surface and thus relieves the sealing face of the seal ring from excessive pressure resulting from high fluid pressure and insures ample bellows flexibility.

Additional objects and advantages will become apparent during the course of the following specification having reference to the accompanying drawing wherein Figures 1 and 2 are vertical sectional views of torque converter structures whose rotor housings need to be sealed and Figure 3 is an enlarged sectional view showing the seal unit parts prior to installation.

The subassembly unit as prepared for shipment and storage comprises a seal ring 1, a flexible bellows 2 and a mounting holder 3 permanently secured together in axially internested relation as best seen in Figure 3. To this subassembly there is to be added at the time of installation and use a centering ring or thrust washer 4, a wave spring 5, a retainer washer 6 and a snap ring 7 also shown in Figure 3 in exploded relation to the subassembly. These loose parts are to be inserted in succession into the reduced end portion 8 of the holder 3 at the time of use with the snap ring 7 fitted releasably to the annular groove 9 for locking the parts together. When so applied to the holder 3 and with the holder in working relation to the structure to be sealed the trued or lapped face of the sealing ring 1 will abut and be urged by the spring 5 to a running fit with a companion ring 10 as in Figure 1. The imperforate flexible bellows completes the closure and yields to accommodate whatever slight axial movement of the sealing ring is required to accommodate manufacturing tolerances and wear but by reason of the separation of the spring pressure exerting parts before the seal is in use and when the ring 1 has no limiting abutment the bellows is free from deflection stress which otherwise would be placed upon it.

For additional protection the shape and arrangement of the parts relative to one another has been carefully developed, bearing in mind also the importance of compressing the assembly into as limited space as practical for enabling shorter overall axial length of the torque converter unit. Thus it will be noted in Figure 3 that the heavy machined holder ring 3 houses the other more delicate parts and more especially that the bellows is pocketed within the holder. Essentially the holder ring which as shown is intended for a press fit into the shaft receiving opening of the rotor housing consists of stepped or radially offset portions projected axially in opposite directions from a connecting radial web. The web may contain threaded openings 12 to receive a pulling tool and one of the offsets provides the reduced end portion 8 heretofore mentioned and which locks and guides the separable spring biasing parts. Fitted to the rabbeted end of the peripheral wall of the holder is a thin washer 13 which cooperates in affording the pocket for the bellows. It may be secured both to the holder and to a radial end flange of the bellows by a single soldering operation and it provides a stiff backing for the bellows flange and a reduced unbalance of pressure responsive bellows surface exposed within the pocket.

For the purpose intended and because there is only a slight range of axial movement of the sealing ring with the parts constructed as described a two loop bellows is sufficient. The radial flange at the free end of the bellows terminates in an axially extending lip to cooperate with the flange in forming an angular seat to fit snugly and be cemented on the end face of the carbon ring 1 opposite to its working face. By having the bellows doubled back on the ring so that these parts are internested with reference to each other and to the mounting ring considerable axial space is saved and aiding in the conservation of space is the use of a wave form of spring ring 5. In use the spring bears on one side against the retainer ring 6 and on the other side against the pressure ring 4 bearing on the free end of the bellows in direct axial alignment with the sealing ring. The spring is located against radial displacement by being pocketed within the axially extending flange 14 of the pressure ring or thrust washer 4 and the peripheral surface of this flange increases the bearing surface of the thrust ring in its sliding engagement with the interior cylindrical surface of the end extension 8.

As seen in Figures 1 and 2 a running fit seal is installed in each side of the rotor housing. In Figure 1 the housing 15 is the working chamber for the rotors 16 and 17 splined on the driving and driven shafts 18 and 19, respectively. Each shaft carries a bearing ring 10 for cooperation with the seal ring 1 and is mounted in antifriction bearings 20. Any leakage past the sealing ring will be carried back to the working chamber by a drain passage 21 drilled in the housing wall. It has been found expedient as a safety factor to employ a secondary seal beyond the drain passage 21 and for this purpose a conventional type of spring pressed leather wiper seal 22 is shown in Figure 1 engaging the periphery of the rotating ring 10.

Optionally there may be employed as the secondary seal a thrower and baffle structure dependent for effectiveness on the centrifugal action of the rotating parts. A satisfactory arrangement of secondary seal is shown in Figure 2 wherein the bearing ring 10' has its far corner beveled and its side adjacent the shaft support bearing milled out to provide a re-entrant pocket into which extends the offset edge of a diaphragm or baffle ring 22' fixedly mounted in the housing. This baffle should be formed of brass or the like and be of slightly less thickness than the gap into which it extends. A gap of from .004 to .012 of an inch has been found practical and commercial thickness stock can be used. The baffle can rub on either side without ill effects since its pressure is very light. It forms a stop against oil loss and centrifugal force throws the oil away from the small gap during the normal operation of the transmission.

It has advantages over the wiper lip type of seal illustrated in Figure 1 largely because its effectiveness always remains the same and is not reduced with service because there are no wearing parts nor parts which require individual close fitting as is the case with leather seals. Leather seals seem to run too tight and then heat up or too loose and then leak. Furthermore the labyrinth seal constitutes an automatic high level controller in that if the transmission is over-filled excess oil will be thrown out before the vehicle moves out of the service garage. In tests the height of level at which no leak occurred is a standing level substantially as indicated by line L—L and which is the filling level specified by the manufacturer for this particular transmission structure with splash lubrication. Consequently, the automatic elimination of excess oil will prevent damage due to overheating and the inadvertent leakage of oil to undesirable places. Furthermore, leakage on the garage floor will draw attention to careless overfilling and, therefore, reduce this bad habit and save oil. At the same time the seal permits and encourages passage of lubricating oil around shaft bearings and its simplicity reduces costs. Upon spinning of the rotors 16' and 17' the oil thrown off passes through the drain hole 21' to the working chamber of the housing 15'.

In the transmission of Figure 2 the rotor shafts 18' and 19' are hollow and surround a direct shaft 23 and this arrangement necessitates the use of a center seal 24. For convenience the center seal illustrated is a known type but it can be replaced by a structure following generally that heretofore described. It will be understood also that if desired the carbon ring and mounting holder can be reversed in relation to one another whereby the holder will be nested interiorly of an exterior carbon ring and furthermore that the holder instead of being mounted in a stationary support may be secured on the rotating part with the seal ring then abutting a complementary ring which is stationary. Optionally, of course, both the mounting ring and the sealing ring can be carried on parts which are both rotatable but at variable relative speeds.

I claim:

1. A running fit seal between relatively rotatable parts comprising a seal ring having a sealing face at its front end, an imperforate flexible axially extending tubular bellows telescopically surrounding the ring in nested sleeved relation thereto and having its rear end joined to the rear end of the seal ring and its forward end located intermediate the front and rear ends of the seal ring, a cupped carrier having its cylindrical skirt telescopically sleeved on and surrounding the bellows in nested relation thereto and at its front end permanently joined to the front end of the tubular bellows and having its radial flange located behind the rear end of the seal ring and terminating centrally in an outwardly projecting cylindrical bearing surface, a pressure distributing ring slidably supported on said cylindrical bearing surface and engaging the bellows joined end of the seal ring, a spring acting on the pressure ring and a snap ring retainer engageable with the radial flange for detachably mounting the spring and the pressure ring on said radial flange.

2. In a running fit seal, a seal ring having a trued bearing face and being formed of carbon or the like, a tubular mounting holder in concentric nested relation with the ring, a tubular metal bellows having axially spaced end flanges extending radially inwardly and outwardly, respectively, one adjacent one end of the ring and the other adjacent the opposite end of the holder, and having axially spaced corrugations connecting said axially spaced end flanges and being pocketed between and in sleeved relation to both the holder and the ring, a backing and stiffening washer soldered face to face with one of said flanges and secured to one end of said holder, an axially extending flange at the terminus of the other end flange providing with the adjacent face of the flange, an angular seat to which the seal ring is cemented, a pressure ring bearing on the opposite face of the last mentioned flange in the region of said seat and having a sliding bearing on an end portion of said holder, spring pressure means active on said pressure ring, and means detachably secured to said end portion of the holder for retaining the spring means and slidable pressure plate in disconnectible assembly relation with the bellows carried seal ring.

3. In combination, a cylindrical mounting holder, a flexible tubular bellows having axially spaced corrugations in nested relation with the cylindrical holder and terminating in radial end flanges, one of which is anchored to the holder near one end, a running seal in nested relation to the tubular bellows and permanently secured to the movable free end flange of the bellows and projected from said free end flange toward the anchored end flange in telescopic relation to both the holder and the axially spaced corrugations of the tubular bellows, a pressure ring engaging the free flange of the bellows and slidably engaging a bearing guide on the opposite end of the holder, a retainer detachably mounted on said bearing guide and spring biasing means confined by said retainer in pressure exerting relation to said slidable pressure ring.

4. In combination, an axially extending flexible bellows, a seal ring permanently secured to the free end of the bellows in concentrically nested relation therewith, a holder fitted to and protectively housing the bellows in concentrically nested relation and permanently secured to the fixed end of the bellows, a radially offset guide bearing on the holder beyond the free end of the bellows, a retainer detachably secured to said guide bearing, a removable seal ring biasing spring held by said retainer and a thrust washer interposed between said spring and the free end of the bellows and provided with an axially extending guide flange having sliding bearing on said holder guide bearing and radially locating said spring in relation thereto.

MALVERN S. BAKER.